(12) United States Patent
Bae et al.

(10) Patent No.: US 8,091,092 B2
(45) Date of Patent: *Jan. 3, 2012

(54) LOCALLY PROVIDING GLOBALLY CONSISTENT INFORMATION TO COMMUNICATIONS LAYERS

(75) Inventors: Myung M. Bae, Pleasant Valley, NY (US); Paul D. DiNicola, Hurley, NY (US); Chulho Kim, Poughkeepsie, NY (US); Rajeev Sivaram, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

This patent is subject to a terminal disclaimer.

(21) Appl. No.: 11/848,050

(22) Filed: Aug. 30, 2007

(65) Prior Publication Data

US 2007/0294709 A1 Dec. 20, 2007

Related U.S. Application Data

(62) Division of application No. 10/159,759, filed on May 31, 2002, now Pat. No. 7,302,692.

(51) Int. Cl.
*G06F 9/44* (2006.01)
(52) U.S. Cl. ........................................ 719/318; 719/321
(58) Field of Classification Search .................. 719/310, 719/318, 321
See application file for complete search history.

(56) References Cited

U.S. PATENT DOCUMENTS

| | | | |
|---|---|---|---|
| 4,825,206 A | 4/1989 | Brice, Jr. et al. | 340/825.05 |
| 5,109,486 A | 4/1992 | Seymour | 395/200 |
| 5,117,352 A | 5/1992 | Falek | 395/575 |
| 5,214,776 A | 5/1993 | Bagnoli et al. | |
| 5,235,597 A | 8/1993 | Himwich et al. | |
| 5,247,673 A | 9/1993 | Costa et al. | |
| 5,274,789 A | 12/1993 | Costa et al. | |
| 5,303,235 A | 4/1994 | Chan et al. | |
| 5,450,601 A | 9/1995 | Okuda | 395/800 |
| 5,513,345 A | 4/1996 | Sato et al. | 395/182.02 |
| 5,528,587 A | 6/1996 | Galand et al. | |
| 5,539,881 A | 7/1996 | Hunt et al. | |
| 5,542,047 A | 7/1996 | Armstrong | 395/200.11 |
| 5,546,540 A | 8/1996 | White | 395/200.11 |
| 5,602,841 A | 2/1997 | Lebizay et al. | |
| 5,621,721 A | 4/1997 | Vatuone | |

(Continued)

FOREIGN PATENT DOCUMENTS

EP 582534 2/1994

(Continued)

OTHER PUBLICATIONS

Office Action for U.S. Appl. No. 10/159,759 (U.S. Letters Patent No. 7,302,692 B2), dated Oct. 5, 2005.

(Continued)

*Primary Examiner* — Van Nguyen
(74) *Attorney, Agent, or Firm* — Libby Toub, Esq.; Kevin P. Radigan, Esq.; Heslin Rothenberg Farley & Mesiti P.C.

(57) ABSTRACT

Globally consistent information is locally provided to communications layers. Globally consistent information is stored in a Network Availability Matrix, which is locally accessible by a communications layer. If an event is detected, the communications layer is automatically notified by the Network Availability Matrix, and is able to use the information in the Network Availability Matrix to quickly take action.

9 Claims, 8 Drawing Sheets

U.S. PATENT DOCUMENTS

| | | | |
|---|---|---|---|
| 5,640,513 A | 6/1997 | Dauerer et al. | 395/200.11 |
| 5,758,077 A | 5/1998 | Danahy et al. | 395/200.31 |
| 5,768,538 A | 6/1998 | Badovinatz et al. | 395/200.78 |
| 5,778,226 A | 7/1998 | Adams et al. | |
| 5,781,703 A | 7/1998 | Desai et al. | 395/54 |
| 5,790,772 A | 8/1998 | Badovinatz et al. | 395/182.02 |
| 5,799,146 A | 8/1998 | Badovinatz et al. | 395/182.02 |
| 5,799,149 A | 8/1998 | Brenner et al. | |
| 5,828,665 A | 10/1998 | Husak | |
| 5,864,851 A | 1/1999 | Breitbart et al. | |
| 5,872,956 A | 2/1999 | Beal et al. | |
| 5,949,974 A | 9/1999 | Ewing et al. | |
| 5,953,328 A | 9/1999 | Kim et al. | |
| 5,991,821 A | 11/1999 | Badovinatz et al. | 709/300 |
| 5,999,931 A | 12/1999 | Breitbart et al. | |
| 6,014,669 A | 1/2000 | Slaughter et al. | |
| 6,016,505 A | 1/2000 | Badovinatz et al. | 709/205 |
| 6,021,437 A | 2/2000 | Chen et al. | |
| 6,026,426 A | 2/2000 | Badovinatz et al. | 709/106 |
| 6,026,447 A | 2/2000 | Badovinatz et al. | 709/300 |
| 6,038,604 A | 3/2000 | Bender et al. | 709/233 |
| 6,058,416 A | 5/2000 | Mukherjee et al. | |
| 6,061,735 A | 5/2000 | Rogers | 709/239 |
| 6,070,189 A | 5/2000 | Bender et al. | 709/224 |
| 6,163,812 A * | 12/2000 | Gopal et al. | 719/310 |
| 6,175,876 B1 | 1/2001 | Branson et al. | 709/252 |
| 6,181,679 B1 * | 1/2001 | Ashton et al. | 370/244 |
| 6,202,099 B1 | 3/2001 | Gillies et al. | |
| 6,229,540 B1 | 5/2001 | Tonelli et al. | |
| 6,246,669 B1 | 6/2001 | Chevalier et al. | |
| 6,253,240 B1 | 6/2001 | Axberg et al. | |
| 6,269,396 B1 | 7/2001 | Shah et al. | 709/223 |
| 6,338,092 B1 | 1/2002 | Chao et al. | 709/236 |
| 6,360,331 B2 | 3/2002 | Vert et al. | |
| 6,370,590 B1 | 4/2002 | Nitz et al. | |
| 6,385,174 B1 | 5/2002 | Li | |
| 6,400,681 B1 | 6/2002 | Bertin et al. | 370/218 |
| 6,438,705 B1 | 8/2002 | Chao et al. | |
| 6,453,356 B1 | 9/2002 | Sheard et al. | 709/231 |
| 6,477,572 B1 | 11/2002 | Elderton et al. | |
| 6,480,473 B1 | 11/2002 | Chambers et al. | |
| 6,516,345 B1 | 2/2003 | Kracht | |
| 6,658,459 B1 | 12/2003 | Kwan et al. | |
| 6,735,620 B1 | 5/2004 | Blackmore et al. | |
| 6,789,257 B1 * | 9/2004 | MacPhail | 719/316 |
| 6,950,846 B2 | 9/2005 | Badovinatz et al. | 709/201 |
| 6,954,757 B2 | 10/2005 | Zargham et al. | |
| 6,971,044 B2 | 11/2005 | Geng et al. | |
| 7,089,289 B1 | 8/2006 | Blackmore et al. | |
| 7,302,692 B2 | 11/2007 | Bae et al. | |
| 2001/0019554 A1 | 9/2001 | Nomura et al. | 370/389 |
| 2001/0034853 A1 | 10/2001 | Takatama et al. | 714/4 |
| 2008/0086737 A1 | 4/2008 | Bae et al. | |

FOREIGN PATENT DOCUMENTS

JP 200216801 8/2000

OTHER PUBLICATIONS

Office Action for U.S. Appl. No. 10/159,759 (U.S. Letters Patent No. 7,302,692 B2), dated Mar. 21, 2006.
Office Action for U.S. Appl. No. 10/159,759 (U.S. Letters Patent No. 7,302,692 B2), dated Jan. 26, 2007.
Office Action for U.S. Appl. No. 09/893,092 (U.S. Letters Patent No. 6,950,846), dated Dec. 17, 2004.
Office Action for U.S. Appl. No. 11/942,993 (U.S. Patent Publication No. 2008/0086737 Al), dated Oct. 12, 2010.
"Link and Control Point Failure", Drake et al., IBM Technical Disclosure Bulletin, vol. 35, No. 1B, Jun. 1992, pp. 405-406.
"Hybrid Topology Database Algorithm", Ahmadi et al., IBM Technical Disclosure Bulletin, vol. 35, No. 6, Nov. 1992, pp. 134-135.
"A Failure Detection and Notification Protocol for Distributed Computing Systems", S.A. Bruso, Proceedings of the 5th International Conference on Distributed Computing Systems, May 13-17, 1985, p. 116-123. (Abstract Only).

* cited by examiner

LOCALLY PROVIDING GLOBALLY CONSISTENT INFORMATION TO COMMUNICATIONS LAYERS

CROSS REFERENCE TO RELATED PATENTS/APPLICATIONS

This application is a divisional of U.S. patent application Ser. No. 10/159,759, filed May 31, 2002, entitled "LOCALLY PROVIDING GLOBALLY CONSISTENT INFORMATION TO COMMUNICATIONS LAYERS," and issued as U.S. Pat. No. 7,302,692 on Nov. 27, 2007, the entirety of which is hereby incorporated herein by reference.

This application also contains subject matter which is related to the subject matter of the following patents, each of which is assigned to the same assignee as this application. Each of the below listed patents is hereby incorporated herein by reference in its entirety:

"PROVIDING A GLOBALLY CONSISTENT DESIRED GROUP OF REACHABLE NODES", Badovinatz et al., U.S. Pat. No. 6,950,846, issued Sep. 27, 2005;

"BARRIER SYNCHRONIZATION METHOD WHEREIN MEMBERS DYNAMIC VOTING CONTROLS THE NUMBER OF SYNCHRONIZATION PHASES OF PROTOCOLS AND PROGRESSION TO EACH NEW PHASE", Badovinatz et al., U.S. Pat. No. 5,768,538, issued Jun. 16, 1998;

"COMMUNICATIONS METHOD INVOLVING GROUPS OF PROCESSORS OF A DISTRIBUTED COMPUTING ENVIRONMENT", Badovinatz et al., U.S. Pat. No. 5,790,772, issued Aug. 4, 1998;

"COMMUNICATIONS SYSTEM INVOLVING GROUPS OF PROCESSORS OF A DISTRIBUTED COMPUTING ENVIRONMENT", Badovinatz et al., U.S. Pat. No. 5,799,146, issued Aug. 25, 1998;

"METHOD FOR SERIALIZING ACTIONS OF INDEPENDENT PROCESS GROUPS", Badovinatz et al., U.S. Pat. No. 5,991,821, issued Nov. 23, 1999;

"PROGRAM PRODUCT TO EFFECT BARRIER SYNCHRONIZATION IN A DISTRIBUTED COMPUTING ENVIRONMENT", Badovinatz et al., U.S. Pat. No. 6,016,505, issued Jan. 18, 2000; and "APPLICATION PROGRAMMING INTERFACE UNIFYING MULTIPLE MECHANISMS", Badovinatz et al., U.S. Pat. No. 6,026,426, issued Feb. 15, 2000.

TECHNICAL FIELD

This invention relates, in general, to communications environments, and in particular, to locally providing communications layers of a communications environment with globally consistent information.

BACKGROUND OF THE INVENTION

In one example, a communications environment includes a plurality of nodes interconnected by a plurality of networks. A node is connected to at least one network via one or more adapters. The use of multiple adapters enables a node to be connected to a network at multiple points, such that multiple transactions can be initiated concurrently.

Communications layers within the nodes are responsible for efficiently utilizing the adapters in providing communication between the nodes. To provide high performance communication, the communications layers may utilize multiple pairs of adapters between nodes simultaneously, and different pairs of adapters between different communication paths.

In order to efficiently utilize the different adapters, a need exists for a capability that enables information relating to the adapters to be provided to the communication layers.

SUMMARY OF THE INVENTION

The shortcomings of the prior art are overcome and additional advantages are provided through the provision of a method of managing events. The method includes, for instance: determining by a component executing on a processor of a communications environment that an event within the communications environment has occurred, the component including globally consistent configuration information of the communications environment; and automatically invoking by the component a handler function registered with the component to at least inform a user of the handler function of the event, the user comprising a communications layer of the communications environment and the component providing the globally consistent configuration information to the communications layer absent any internodal communication by the communications layer to obtain the globally consistent configuration information, wherein the component comprises a network availability matrix executing with internal space of a node of the communications environment, and wherein the event comprises at least one change in the configuration information, the configuration information comprising obtained configuration information of one or more adapters of the communications environment, the configuration information describing one or more characteristics of at least one adapter of the one or more adapters, wherein the automatically invoking the handler function to inform the user of the event ensures that each change of the at least one change in the configuration information. the globally consistent view of which is locally available to the communications layer, is independently seen by the communications layer, and that proper sequencing of the at least one change is provided, and wherein the at least one change in the configuration is included in an information table which is forwarded to the component to facilitate the providing the globally consistent configuration information to the communications layer.

System and computer program products corresponding to the above-summarized methods are also described and claimed herein.

Additional features and advantages are realized through one or more aspects of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

In accordance with an aspect of the present invention, globally consistent information associated with, for instance, communications configurations is locally provided to communications layers of a communications environment. In one example, the globally consistent information includes configuration information, including characteristics of the configuration and/or status information.

Figure 1:
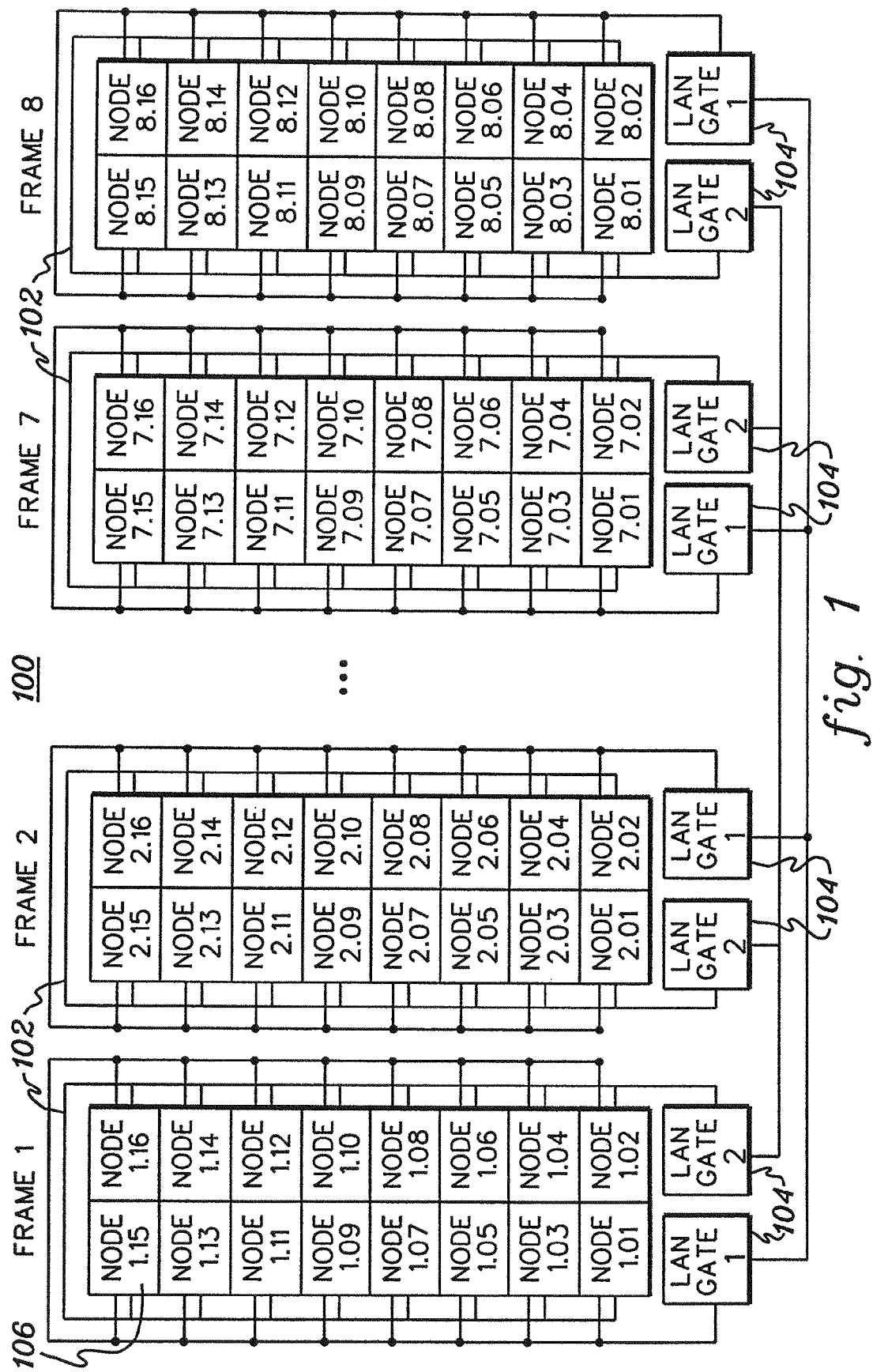
FIG. 1 depicts one embodiment of a communications environment incorporating and using aspects of the present invention.

One embodiment of a communications environment incorporating and using one or more aspects of the present invention is depicted in FIG. 1. As one example, the communications environment is a distributed computing environment 100 including, for instance, a plurality of frames 102 coupled to one another via a plurality of LAN gates 104. Frames 102 and LAN gates 104 are described in detail below.

As one example, distributed computing environment 100 includes eight frames, each of which includes a plurality of processing nodes 106. In one instance, each frame includes sixteen processing nodes (a.k.a., processors). Each processing node is, for instance, a RISC/6000 computer running AIX, a UNIX based operating system. Each processing node within a frame is coupled to the other processing nodes of the frame via, for example, one or more networks, such as one or more internal LAN connections. Additionally, each frame is coupled to the other frames via one or more LAN gates 104.

As examples, each LAN gate 104 includes either a RISC/6000 computer, any computer network connection to the LAN or a network router. However, these are only examples. It will be apparent to those skilled in the relevant art that there are other types of LAN gates and that other mechanisms can also be used to couple the frames to one another.

The distributed computing environment of FIG. 1 is only one example. It is possible to have more or less than eight frames, or more or less than sixteen nodes per frame. Further, the processing nodes do not have to be RISC/6000 computers running AIX. Some or all of the processing nodes can include different types of computers and/or different operating systems. Further, aspects of the invention are usable with other types of communications environments. All of these variations are considered a part of the claimed invention.

Figure 2:
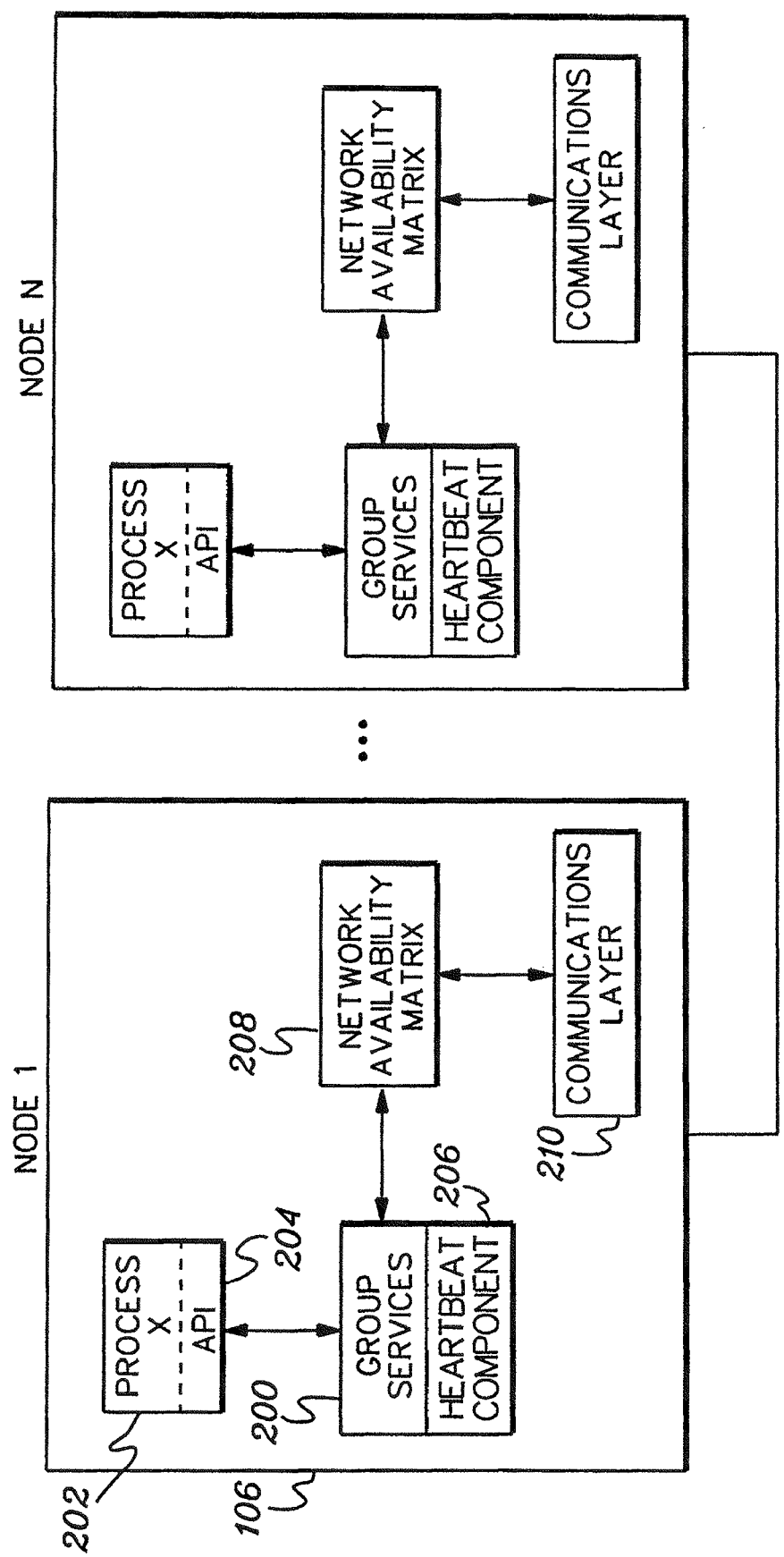
FIG. 2 depicts one example of an expanded view of a plurality of processing nodes of the communications environment of FIG. 1, in accordance with an aspect of the present invention.

In one example, distributed across a plurality of the processing nodes of distributed computing environment 100 is a Group Services subsystem used by one or more aspects of the present invention. In particular, in one example, a Group Services daemon 200 (FIG. 2) is located within one or more of processing nodes 106. The Group Services daemons are collectively referred to as Group Services.

Group Services facilitates, for instance, communication and synchronization between multiple processes of a group of processes executing on one or more nodes. A process 202 (such as a provision process of the present invention, as described below) desirous of using the facilities of Group Services is coupled to a Group Services daemon 200. In particular, the process is coupled to Group Services by linking at least a part of the code associated with Group Services (e.g., the library code) into its own code. As one example, the process uses an application programming interface (API) 204 to access aspects of Group Services.

Group Services is further described in U.S. Pat. No. 5,768,538 entitled "Barrier Synchronization Method Wherein Members Dynamic Voting Controls The Number of Synchronization Phases Of Protocols And Progression To Each New Phase", issued Jun. 16, 1998; U.S. Pat. No. 6,026,426, entitled "Application Programming Interface Unifying Multiple Mechanisms", issued Feb. 15, 2000; U.S. Pat. No. 6,016,505, entitled "Program Product To Effect Barrier Synchronization In A Distributed Computing Environment", issued Jan. 18, 2000; U.S. Pat. No. 5,799,146, entitled "Communications System Involving Groups Of Processors Of A Distributed Computing Environment", issued Aug. 25, 1998; U.S. Pat. No. 5,790,772, entitled "Communications Method Involving Groups Of Processors Of A Distributed Computing Environment", issued Aug. 4, 1998; and U.S. Pat. No. 5,991,821, entitled "Method For Serializing Actions Of Independent Process Group", issued Nov. 23, 1999, each of which is hereby incorporated herein by reference in its entirety.

In one embodiment, Group Services is coupled to a heartbeat component 206 used to indicate whether a particular component of the communications environment is active. In this example, the heartbeat component is used to determine whether adapters of the one or more networks of the environment are up and running, as described in further detail below.

In accordance with an aspect of the present invention, Group Services is also coupled to a Network Availability Matrix (NAM) 208, which includes a repository for globally consistent information, as well as provides a simple and easy-to-use application programming interface for use by user mode applications, as well as kernel mode applications, as described in further detail below.

In one example, the Network Availability Matrix is coupled to a communications layer 210 of the node, such as the Low-Level Application Programming Interface (LAPI), offered by International Business Machines Corporation, Armonk, N.Y.

LAPI is a high-performance, one-sided communications protocol, in which there is no pairing of send and receive messages. LAPI is described in detail in, for instance: U.S. Pat. No. 6,070,189 entitled "Signaling Communication Events In A Computer Network", by Bender et al., issued May 30, 2000; U.S. Pat. No. 6,038,604 entitled "Method And Apparatus For Efficient Communications Using Active Messages", by Bender et al., issued Mar. 14, 2000; U.S. Patent Application entitled "Mechanisms For Efficient Message Passing With Copy Avoidance In A Distributed System Using Advanced Network Devices", by Blackmore et al., Ser. No. 09/619,051, filed Jul. 18, 2000; and U.S. Patent Application entitled "Efficient Protocol For Retransmit Logic In Reliable Zero Copy Message Transport", by Blackmore et al., Ser. No. 09/619,054, filed Jul. 18, 2000, each of which is hereby incorporated herein by reference in its entirety.

Figure 3:
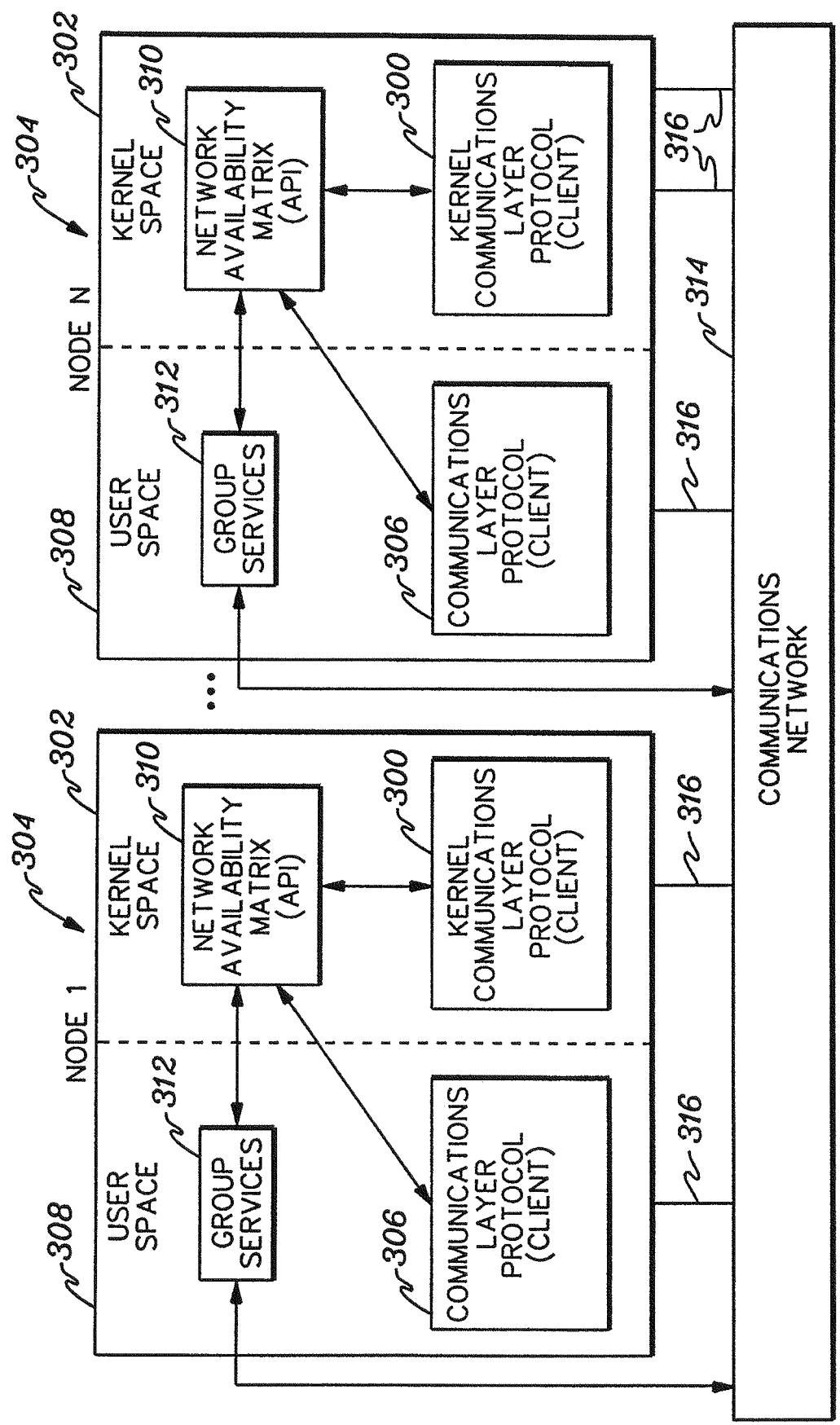
FIG. 3 depicts one example of a further view of the processing nodes of FIG. 2, in which each node is partitioned into user space and kernel space, in accordance with an aspect of the present invention.

In one embodiment, the communications layer includes two portions: a kernel portion 300 (FIG. 3) residing in kernel space 302 of a node 304, and a user portion 306 residing within user space 308 of node 304. The communications layer is coupled to NAM 310, and NAM 310 is coupled to Group Services 312.

Group Services participates in status communications with at least one communications network 314 (using, e.g., IP). The communications network is coupled to at least one node of the environment by one or more physical links 316. Further details regarding the coupling of a node to a network is described with reference to FIG. 4.

Figure 4:
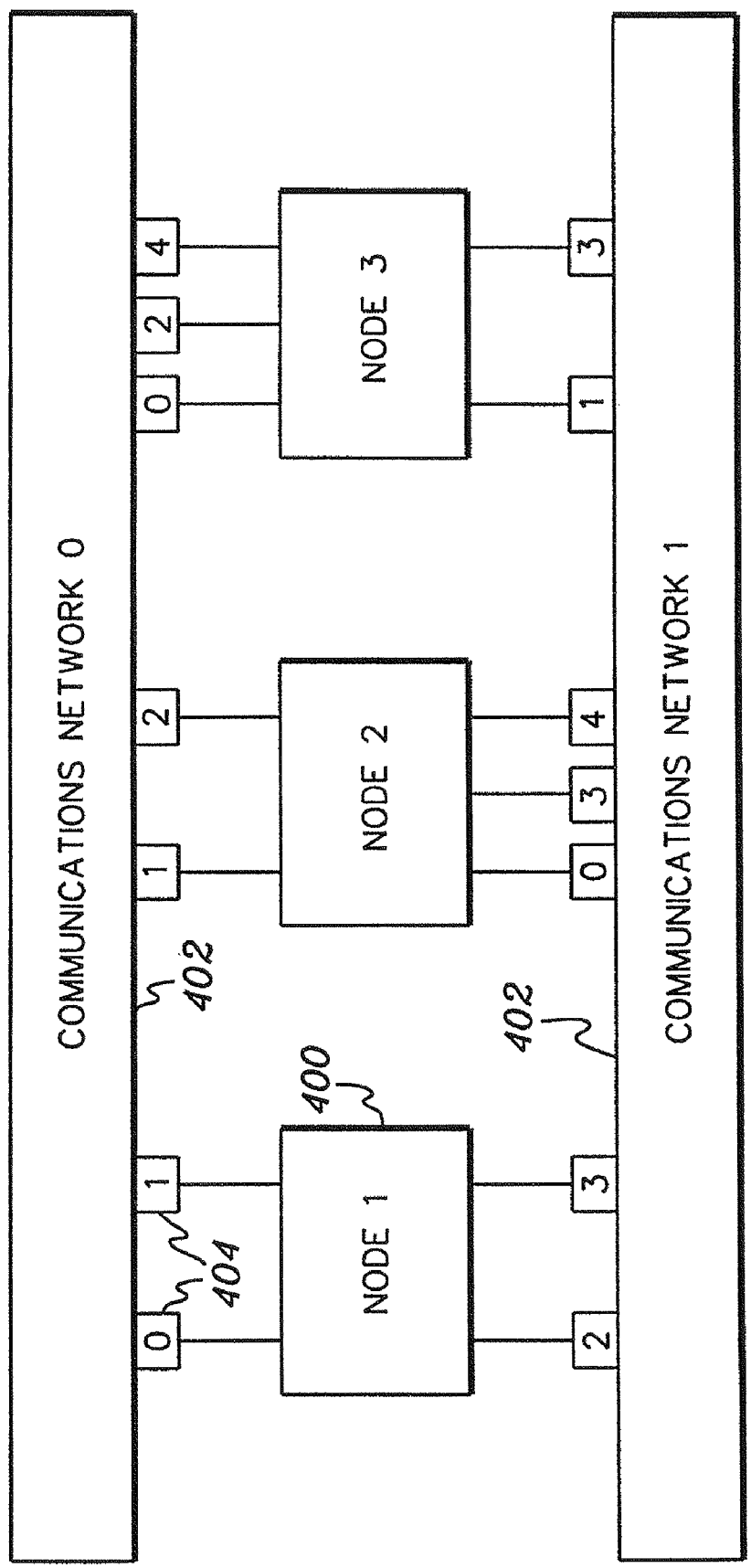
FIG. 4 depicts one example of a plurality of nodes of a communications environment being coupled by a plurality of networks, in accordance with an aspect of the present invention.

As depicted in FIG. 4, a node 400 may be coupled to a plurality of networks 402 (e.g., SP Switch2 switch networks) via one or more adapters 404 (e.g., PCI adapters). The use of multiple adapters to connect the nodes to the network at multiple points enables multiple transactions to be initiated concurrently. For high performance communication, the communications layer may utilize multiple pairs of adapters between nodes simultaneously and different pairs of adapters between different communications paths. One example of communication paths between nodes is depicted in FIG. 5.

Figure 5:
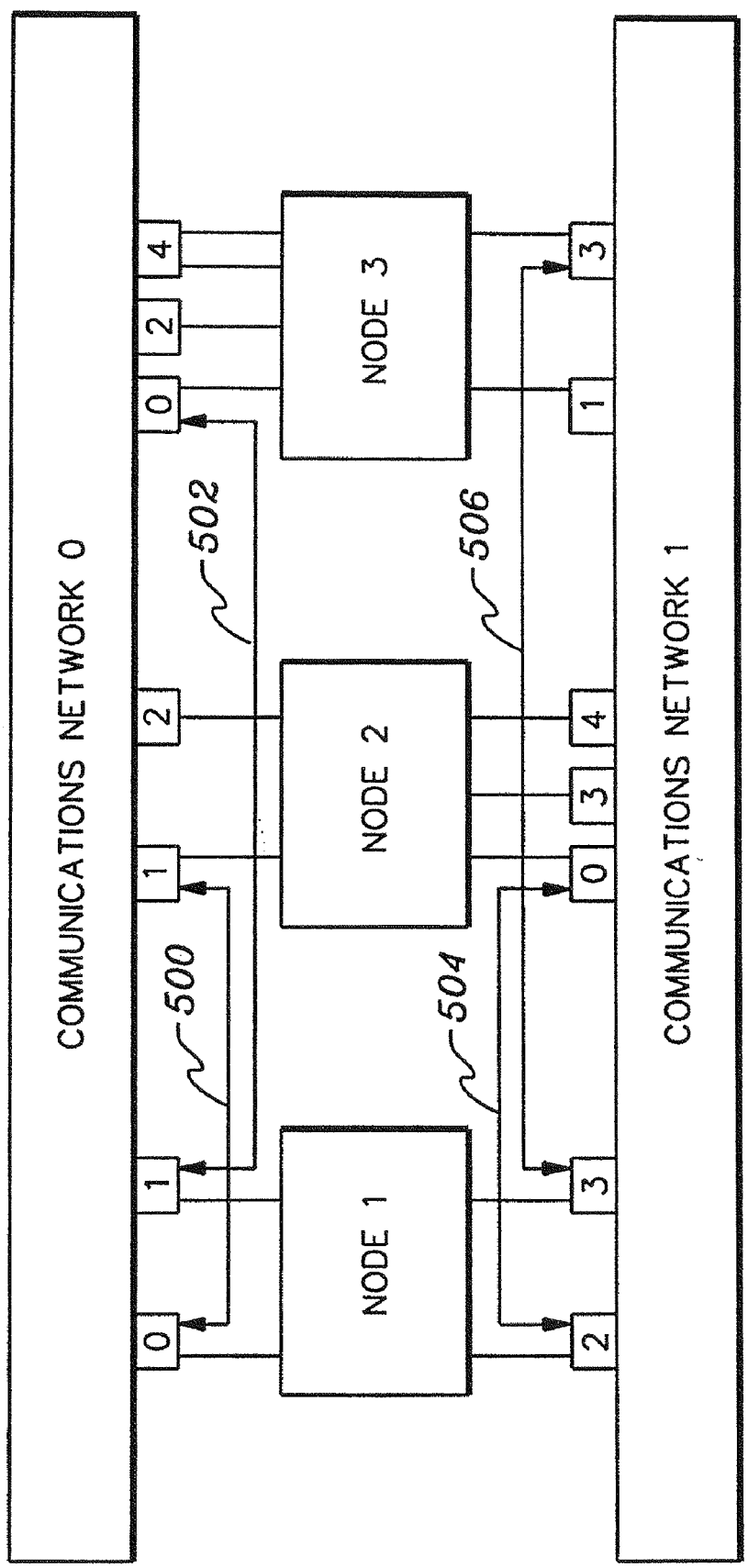
FIG. 5 depicts one example of different communications paths between different nodes of FIG. 4, in accordance with an aspect of the present invention.

As shown in FIG. 5, Node 1 may communicate with Node 2 using path 500 on Network 0, and Node 1 may communicate with Node 3 using path 502 also on Network 0. Similarly, Node 1 may communicate with Node 2 using path 504 on Network 1, and Node 1 may communicate with Node 3 using path 506 on Network 1.

In accordance with an aspect of the present invention, in order to enable high performance communication between distributed nodes, the communications layer of each node (or a subset of the nodes) is provided information regarding the communications configuration of the nodes (e.g., regarding one or more adapters of one or more networks). The view of this information is globally consistent, in that a change in the information is reflected to other nodes desirous of this information. Further, this globally consistent view of the information is maintained locally at the node (e.g., within the kernel space of the node).

In order to locally provide this globally consistent information, as one example, a process (referred to herein as a provision process) executes on each node within the environment that is interested in obtaining the information. Each process includes the provision logic, as well as software objects to be employed. The logic also uses groups created by Group Services. Further details regarding the Group Services groups and the various software objects are provided below.

As one example, the following groups are managed by Group Services:

GlobalAdaptMbrGroup# (where # is 1 to n): Each of these groups includes one or more processes of one or more nodes that are associated with a particular communications network being monitored for globally consistent configuration notifications (e.g., up and down status of the adapters of the associated network). For instance, for the example depicted in FIG. 4, there are two groups, GlobalAdaptMbrGroup1 and GlobalAdaptMbrGroup2, one for each of the networks. GlobalAdaptMbrGroup1 includes three provision processes, one for each of Nodes 1-3, and coincidentally, GlobalAdaptMbrGroup2 also includes three provision processes, one for each of Nodes 1-3. (The groups may have differing numbers of processes.)

The plurality of software objects used by one or more aspects of the present invention include, for instance, the following:

(1) RawAdaptEvtSubscriber: This object is responsible for handling raw adapter event notifications for the communications adapters of the interested networks. This object keeps the status of each local communications adapter for each network associated with the node executing the provision process handling this object, and provides a callback routine to be called when the status of a local adapter changes. It includes, for instance, the following:

Status[ ]—UP or DOWN for an associated adapter. For example, AdapterStatus[1] indicates the status of Adapter 1. That is, it indicates whether communications can occur through the adapter.

SubscribeCb( )—is called by an API of Group Services (GSAPI), in response to a change in the status of an adapter. This callback routine sets the Status[ ], as well as notifies an associated GlobalAdaptMbrProvider object (described below).

Pointers to related GlobalAdaptMbrProvider[ ].

(2) GlobalAdaptMbrProvider: This object is responsible for maintaining the globally consistent network adapter membership of GlobalAdaptMbrGroup# (e.g., GlobalAdaptMbrGroup1 or GlobalAdaptMbrGroup2). This object keeps the state that indicates whether the local node (i.e., the provision process of that node) joins the GlobalAdaptMbrGroup or not, and provides a callback AdaptEvtNotifiedCb( ) routine, which is called by the RawAdaptEvtSubscriber object. It includes, for instance, the following:

State—JOINED or IDLE.

AdaptEvtNotifiedCb( )—notified by RawAdaptEvtSubscriber object when an AdaptEvt occurs.

Pointer to RawAdaptEvtSubscriber object.

(3) GlobalAdaptMbrSubscriber: This object is responsible for handling a subscription to the globally consistent network adapter membership. This object maintains the membership list of its associated GlobalAdaptMbrGroup. It includes, for instance, the following:

AdaptMbrship—list of adapter membership of its associated GlobalAdaptMbrGroup.

Pointer to GlobalAdaptMbrProvider object.

SubscribeCb( )—is called by GSAPI, in response to a membership change of the associated GlobalAdaptMbrGroup group.

Figure 6:
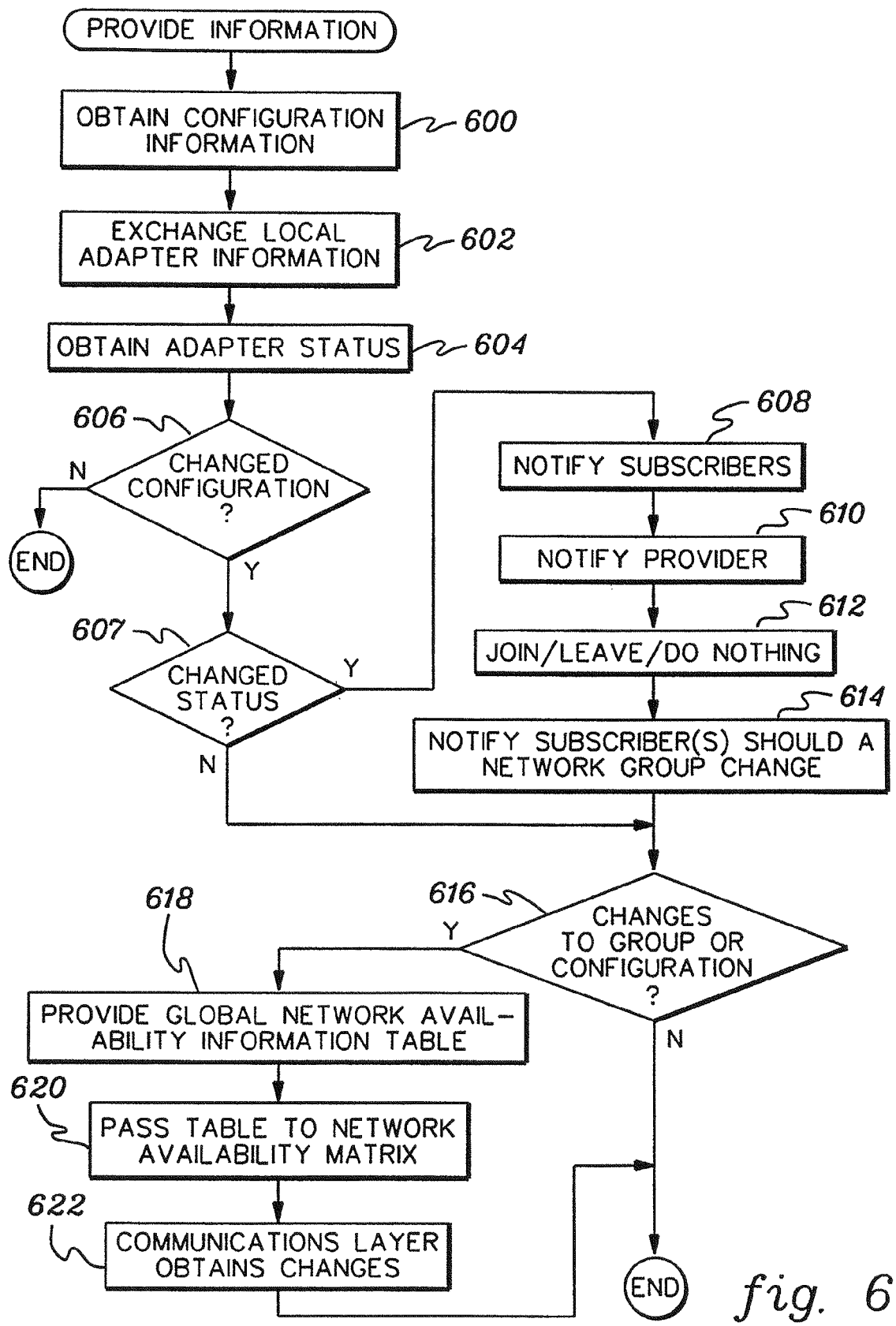
FIG. 6 depicts one embodiment of the logic associated with locally providing globally consistent information to communications layers of the communications environment of FIG. 1, in accordance with an aspect of the present invention.
Figure 7:
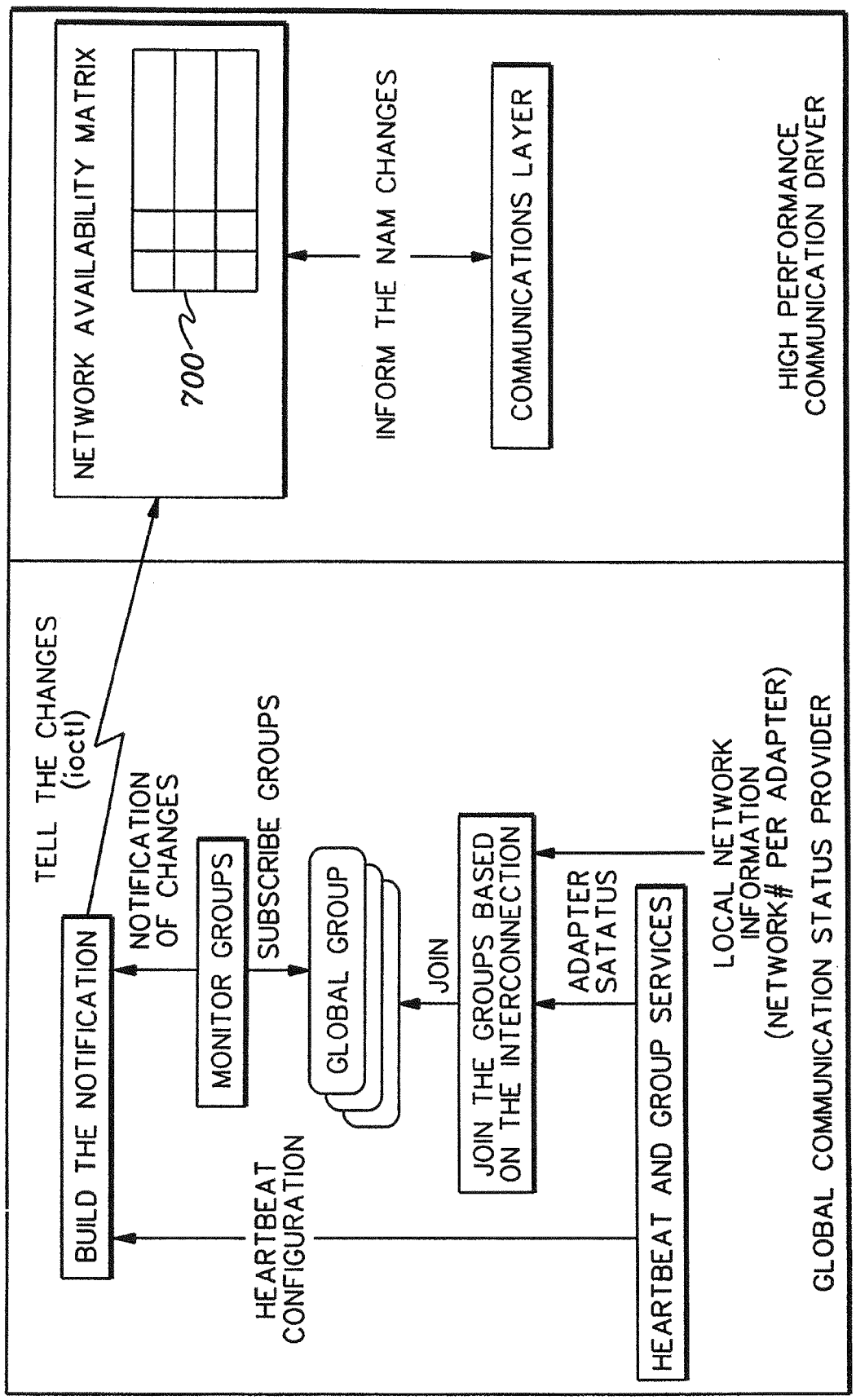
FIG. 7 pictorially depicts various stages of processing of FIG. 6, in accordance with an aspect of the present invention.

The above described objects and groups are used, in accordance with an aspect of the present invention, to determine and locally provide globally consistent information to communications layers of the communications environment. One embodiment of the logic associated with determining and providing such information is described with reference to FIGS. 6-7. In particular, FIG. 6 depicts one embodiment of the logic, while FIG. 7 pictorially depicts an overview of the logic. As one example, the logic is executed by the provision processes executing on one or more nodes of the communications environment, except for those portions handled by other services, such as the heartbeat component and/or Group Services, as indicated below.

Referring to FIG. 6, when a node is started or a configuration is refreshed, as examples, each provision process (or a subset thereof) executes in order to locally provide globally consistent information. Upon execution on a node, configuration information relating to, for instance, local adapters of the node is obtained (e.g., collected, provided, have, received), STEP 600. In one example, a node identifies its local adapters using standard UNIX system calls (e.g., ioctl (SIOCGCONF)), which provide a list of the local adapters for the node, including the adapter name (e.g., interface name and device name), IP address and node number. Then, for each adapter on the list, device specific information is obtained using, for instance, ioctl(IOCINFO), which provides the logical id, network id, and adapter device type, as examples.

Thereafter, using Group Services' group messaging facility, the local adapter information is provided to the other nodes of the environment. Further, this node receives information from the other nodes, such that each node has the same global information, STEP 602. Group Services' group messaging facility allows fault-tolerant message broadcast between the process members in a given group, and thus, each node can send its local adapter information to the other nodes. Group services' group messaging facility ensures that each change is independently seen at each node and that proper sequencing of the changes is provided. Group messaging is described in further detail in one or more of the above-referenced applications/patents.

In addition to the above, other configuration information, such as adapter status information, is obtained, STEP 604. For example, the heartbeat component of the node sends a message to each of its associated adapters and waits for a return message. If such a message is not returned from an adapter, then the heartbeat component determines that the adapter is inaccessible.

Subsequently, a determination is made as to whether the configuration information (e.g., characteristics and/or status) has changed, INQUIRY 606. If not, then processing is complete. However, if a configuration change has occurred, then a further determination is made as to whether status has changed, INQUIRY 607. If the status has changed, then the heartbeat component notifies Group Services of the change, and Group Services notifies a subscriber to the event (referred to herein as RawAdaptEvtSubscriber) of the status change, STEP 608. For example, the Application Programming Interface (API) of Group Services invokes RawAdaptEvtSubscriber→SubscribeCb( ) on the node detecting the status change. SubscribeCb( ) sets the adapter status (i.e, Status[ ]) to either up or down, according to the adapter events.

Further, the subscriber notifies its associated provider of the event, STEP 610. (In one embodiment, the subscriber and provider are in the same process.) For instance, if the adapter event is related to Network #n, then the subscriber notifies GlobalAdaptMbrProvider[n]. In the example depicted in FIG. 4, either GlobalAdaptMbrProvider[1] for Network #1 or GlobalAdaptMbrProvider[2] for Network #2 is notified. In particular, the AdaptEvtNotifiedCb( ) of that provider is called. (In another embodiment, one or more subscribers are notified of the event, and one of those subscribers notifies a provider.)

When a GlobalAdaptMbrProvider object receives an AdaptEvtNotifiedCb( ) callback, it determines whether it will join its associated network group (e.g., GlobalAdaptMbrProvider[n]), leave the group or do nothing, STEP 612. The decision is based on the following: If the local adapter (i.e., an adapter of the node including the provider object) is newly up and the state is equal to Idle, then the provider joins the group GlobalAdaptMbrGroup[n], and sets the state to Joined. However, if a local adapter is newly down and the state is Joined, then the provider leaves the group GlobalAdaptMbrGroup[n], and sets the state to Idle. Otherwise, the provider takes no action.

If the network group (a.k.a., global group) changes, then one or more subscriber objects (referred to herein as GlobalAdaptMbrSubscriber(s)) interested in changes to the network group are notified, STEP 614. In one example, each node of the various networks includes a subscriber to this event. Thus, in the example of FIG. 4, Nodes 1-3 subscribe to this event. (In another embodiment, a subset of the nodes subscribe.) To notify each subscriber, the Group Services API calls GlobalAdaptMbrSubscriber→SubscribeCb( ) on the subscriber's node.

In addition to the above, if there are changes to a global group or to the configuration information, INQUIRY 616, a global network availability information table is provided (e.g., built and/or updated), STEP 618. In one example, this table (depicted at 700 in FIG. 7) includes configuration information for each of the adapters of the communications environment (or a subset thereof). In one example, for each adapter, it includes the adapter's IP address, status, network number, and/or any other desired configuration information. This information is globally consistent, since it is the same on each node. That is, each node executes the provision process to provide this table, in response to a change in configuration information and/or a change in a global group.

Subsequent to providing the network availability information table, the table is passed to the Network Availability Matrix (NAM), STEP 620 (FIG. 6), and the NAM informs the communications layer of the changes, STEP 622. In one instance, this is accomplished by invoking a user registered handler function associated with the communications layer, as described herein.

In one embodiment, the communications layer uses the NAM API to design a registered function handler that enables the communications protocol to be informed of changes, and to perform any recovery actions necessitated by a change in the system-wide connection status (e.g., adapters losing their connections to the network, adapters resuming their connection to the network, new adapters/nodes being added to the network, etc.). Thus, the function handler enables the communications layer to be automatically notified of changes, which although globally consistent, are locally stored at the node.

Figure 8:
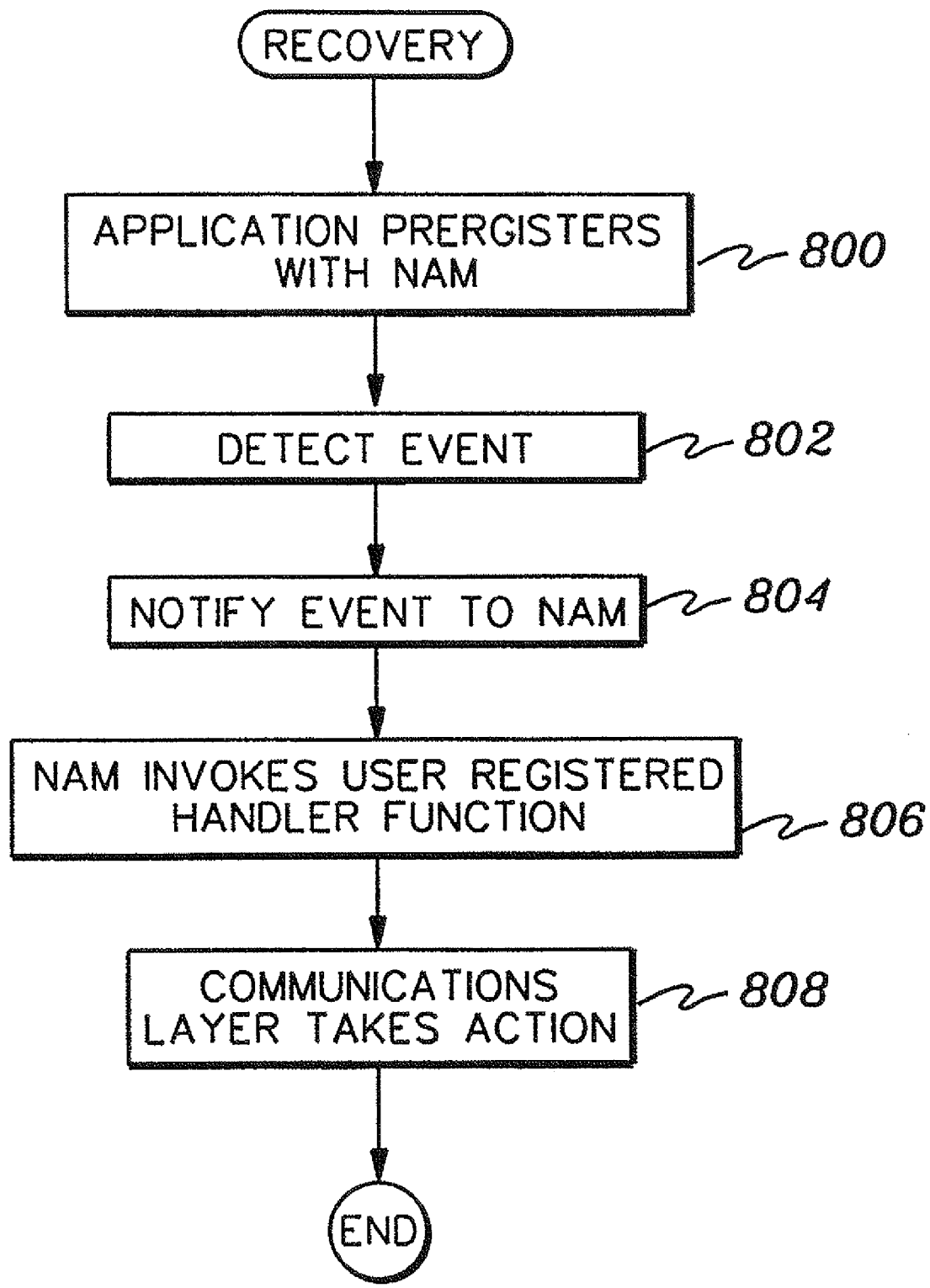
FIG. 8 depicts one embodiment of the logic associated with a recovery capability, in accordance with an aspect of the present invention.

In accordance with a further aspect of the present invention, when a recovery action is to take place, in response to, for instance, a communications failure (due to, e.g., failure of one of the nodes, failure of a provision process on a node, or blocking of a node from communicating with other nodes) or another change (due to, e.g., an adapter resuming connection to the network, an adapter being added to the network, or a node being added to the network), a process on one or more nodes receives an event notification and takes action, as described with reference to FIG. 8.

Referring to FIG. 8, initially, a registration process takes place, in which each node that wishes to receive event notifications has an application of that node (e.g., LAPI) register with NAM, STEP 800. As examples, the registration may be in the form of specifying a function that is to be called on behalf of the application, or in the form of a request for a signal on which one of the application's threads waits. The registration enables the application to obtain current global status from NAM, which is provided and maintained by Group Services, and to be notified of events.

At some point, an event, such as a failure or other change, is detected by, for instance, a heartbeat component, which notifies Group Services of the event, STEP 802. Group Services then provides notification of the event to the NAM on the nodes affected by the event (e.g., nodes of the environment), such that those nodes have the same view of the network condition, STEP 804.

Thereafter, the NAM on each affected node invokes the user registered handler function, such that the node can handle the event, STEP 806. In response to invocation of the function, the communications layer of each node takes action, STEP 808. For instance, if the event is a failure, then the communications layer checks the information stored in the NAM and selects another path, assuming one is available, without aborting the application. In this approach, the applications can continuously communicate with each other, as long as there is a path, after the quick failover of the communications path. In a further example, if the event is an addition of a path or a node, or the resumption of a path connection, then the communications layer includes this path in its path selection process.

Thus, the NAM provides a basis by which protocols can (i) access global connection status locally by simply making an ioctl system call to a locally available drive; (ii) be informed promptly of any change in network status (without individually polling the network status) to initiate failover/recovery; and (iii) learn of system-wide information (e.g., node numbers, IP addresses, number of adapters on a remote node on each network, etc.) without the need for individually performing communication across the network. This last property is particularly interesting for protocols, such as Kernel LAPI, which operate within the kernel and are used by kernel resident subsystems, such as the Virtual Shared Disk Manager offered by International Business Machines Corporation, for high-performance storage area network-related communication.

As described above, the NAM includes a repository of information maintained, for instance, in kernel space in the form of a pseudo device driver, as well as an API for storing and accessing information from the repository. The NAM utilizes an updating agent to perform the function of collecting connection state and connection characteristics information from the nodes and adapters in the system. This agent is also responsible for periodically examining changes in the status of any of this information on a system-wide basis. This updating agent is Group Services, as one example.

The NAM caters to a number of clients who use the information to initialize communication state, and thereafter, obtain updates from it by either registering a function handler or querying it for updates without performing global state gathering on their own. The clients of the NAM include, for instance, the Kernel Low-level Application Programming Interface (KLAPI), user space Low-level Application Programming Interface (LAPI), a well as others. The use of the NAM discourages these protocol layers from individually polling the network for connection status. It also prevents the timing out on message retransmissions. Further, the update mechanism ensures that protocol instances on nodes see globally consistent status information (i.e., they are in sync with respect to global connection status).

Although in the above embodiment, it is the NAM that invokes the user registered function in response to an event being detected, in other embodiments, other components of the communications environment may have this responsibility.

Described in detail above is a capability for locally providing globally consistent information to communications layers. Further, a capability is provided for facilitating quick selection of an alternate communications path, in response to the detection of a failure on one path. In one example, this selection is transparent to the applications (e.g., LAPI).

The introduction of the NAM enables a simple and easy-to-use programming API to be used by user mode applications, as well as kernel mode applications. With Group Services and NAM together, detail information about the network adapters are notified to applications through uniform and seamless interfaces. Applications are able to use any possible combinations of point-to-point communications (e.g., any asymmetric connections—i.e., one node can have a differing number of adapters than another node), and thus, can maximize the utilization of the networks, as well as increase throughput. Applications are also able to perform failure handling or recovery of each asymmetric connection, which can provide greater reliability. The NAM asynchronously informs its clients of changes in connection status.

In one aspect, the use of high-performance communication using multiple communications switch networks with asymmetric connections is facilitated. The failover of a communication path due to a remote adapter's failure is appropriately coordinated. This coordinated failover facilitates quick and smooth recovery by the communications layer, which otherwise could result in an inconsistent or unrecoverable state. Applications can react in a more efficient manner, in response to being notified of adapter and/or node state changes.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing events, said method comprising:
    determining by a component executing on a processor of a communications environment that an event within the communications environment has occurred, said component including globally consistent configuration information of the communications environment; and
    automatically invoking by the component a handler function registered with the component to at least inform a user of the handler function of the event, the user comprising a communications layer of the communications environment and the component providing the globally consistent configuration information to the communications layer absent any internodal communication by the communications layer to obtain the globally consistent configuration information,
    wherein said component comprises a network availability matrix executing within kernel space of a node of the communications environment, and
    wherein the event comprises at least one change in the configuration information, the configuration information comprising obtained configuration information of one or more adapters of the communications environment, the configuration information describing one or more characteristics of at least one adapter of the one or more adapters, wherein the automatically invoking the handler function to inform the user of the event ensures that each change of the at least one change in the configuration information, the globally consistent view of which is locally available to the communications layer, is independently seen by the communications layer and that proper sequencing of the at least one change is provided, and wherein the at least one change in the configuration is included in an information table which is forwarded to the component to facilitate the providing the globally consistent configuration information to the communications layer.

2. The method of claim 1, further comprising using, by the communications layer, the globally consistent configuration information of the component to select a communications path of the communications environment, in response to the handler function being invoked.

3. The method of claim 1, wherein said event comprises at least one of a network failure and a network change.

4. A computer system for managing events, said computer system comprising:
a memory; and
a processor in communications with the memory, wherein the computer system is configured to perform:
determining by a component of a communications environment that an event within the communications environment has occurred, said component including globally consistent configuration information of the communications environment; and
automatically invoking by the component a handler function registered with the component to at least inform a user of the handler function of the event, the user comprising a communications layer of the communications environment, and the component providing the globally consistent configuration information to the communications layer absent any internodal communication by the communications layer to obtain the globally consistent configuration information,
wherein said component comprises a network availability matrix executing within kernel space of a node of the communications environment, and
wherein the event comprises at least one change in the configuration information, the configuration information comprising obtained configuration information of one or more adapters of the communications environment, the configuration information describing one or more characteristics of at least one adapter of the one or more adapters, wherein the automatically invoking the handler function to inform the user of the event ensures that each change of the at least one change in the configuration information, the globally consistent view of which is locally available to the communications layer, is independently seen by the communications layer and that proper sequencing of the at least one change is provided, and wherein the at least one change in the configuration is included in an information table which is forwarded to the component to facilitate the providing the globally consistent configuration information to the communications layer.

5. The computer system of claim 4, wherein the method further comprises using, by the communications layer, the globally consistent configuration information of the component to select a communications path of the communications environment, in response to the handler function being invoked.

6. The computer system of claim 4, wherein said event comprises at least one of a network failure and a network change.

7. A computer program product for managing events, the computer program product comprising:
a non-transitory storage medium readable by a processor and storing instructions for execution by the processor for performing a method comprising:
determining by a component of a communications environment that an event within the communications environment has occurred, said component including globally consistent configuration information of the communications environment; and
automatically invoking by the component a handler function registered with the component to at least inform a user of the handler function of the event, the user comprising a communications layer of the communications environment, and the component providing the globally consistent configuration information to the communications layer absent any internodal communication by the communications layer to obtain the globally consistent configuration information,
wherein said component comprises a network availability matrix executing within kernel space of a node of the communications environment, and
wherein the event comprises at least one change in the configuration information, the configuration information comprising obtained configuration information of one or more adapters of the communications environment, the configuration information describing one or more characteristics of at least one adapter of the one or more adapters, wherein the automatically invoking the handler function to inform the user of the event ensures that each change of the at least one change in the configuration information, the globally consistent view of which is locally available to the communications layer, is independently seen by the communications layer and that proper sequencing of the at least one change is provided, and wherein the at least one change in the configuration is included in an information table which is forwarded to the component to facilitate the providing the globally consistent configuration information to the communications layer.

8. The computer program product of claim 7, wherein said method further comprises using, by the communications layer, the globally consistent configuration information of the component to select a communications path of the communications environment, in response to the handler function being invoked.

9. The computer program product of claim 7, wherein said event comprises at least one of a network failure and a network change.

* * * * *